United States Patent [19]

Cuff

[11] 3,968,700
[45] July 13, 1976

[54] DEVICE FOR CONVERTING ROTARY MOTION INTO A UNIDIRECTIONAL LINEAR MOTION

[76] Inventor: Calvin I. Cuff, 135 Ocean Ave., Brooklyn, N.Y. 11225

[22] Filed: Aug. 1, 1974

[21] Appl. No.: 493,748

[52] U.S. Cl. .................................................. 74/84 S
[51] Int. Cl.² ........................................ F16H 27/04
[58] Field of Search ..................................... 74/84 S

[56] References Cited
UNITED STATES PATENTS

| | | | |
|---|---|---|---|
| 1,953,964 | 4/1934 | Laskowitz | 74/84 S |
| 2,009,780 | 7/1935 | Laskowitz | 74/84 S |

FOREIGN PATENTS OR APPLICATIONS

| | | | |
|---|---|---|---|
| 933,483 | 1/1948 | France | 74/84 S |

Primary Examiner—Samuel Scott
Assistant Examiner—Wesley S. Ratliff, Jr.

[57] ABSTRACT

This invention relates to new and useful improvements in devices that convert the centrifugal forces produced by rotating masses into a propulsive force acting in one direction and which is comprised of a movable supporting structure in which identical sets of masses rotate in opposite directions about an axis which is perpendicular to the desired direction of travel and a mechanism for continuously varying the radius of gyration of each mass during its cycle of revolution.

2 Claims, 3 Drawing Figures

DEVICE FOR CONVERTING ROTARY MOTION INTO A UNIDIRECTIONAL LINEAR MOTION

CROSS-REFERENCE TO PRIOR APPLICATIONS

| Serial Number | Filing Date |
|---|---|
| 486,700 – 213 | July 8, 1974 |

BACKGROUND OF THE INVENTION

1. Field of the Invention

This invention, in general, is related to a class of devices which utilize the centrifugal forces produced by rotating masses to produce a single unbalanced propulsive force acting in one direction.

One method of producing an unbalanced centrifugal force is by varying the angular velocity of identical sets of contrarotating eccentric masses at predetermined moments in their cycle of revolution. Another method is to vary the radius of gyration of identical sets of contrarotating masses at predetermined moments in their cycle of revolution.

2. Description of the Prior Art

The prior art has provided several systems which, for one reason or another, suffer many disadvantages making them not acceptable to general usage, such as being overly complex to manufacture, require complex driving systems and critically interrelated rotating components, and the like.

SUMMARY OF THE INVENTION

The present invention produces an unbalanced centrifugal force by varying the radius of gyration of rotating masses at predetermined moments in their cycle of revolution by means of an eccentrically disposed circular member. The path of rotation of the rotating masses contains certain predetermined sectors in which each rotating mass attains a maximum radial distance and then, after 180° more of rotation, a minimum radial distance. The position of that predetermined sector in which the rotating masses attain their maximum radial distance corresponds to the direction of travel and that predetermined sector in which the rotating masses attain their minimum radial distance corresponds to the direction that is opposed to the desired direction of travel. The rotating masses and the eccentrically disposed circular members are arranged in such a manner that those rotating masses which, at a given moment, are producing centrifugal-force components in the direction opposed to the desired direction of travel are either positioned at, or just approaching, or just leaving the minimum-radial-distance predetermined sector, and those rotating masses which, at a given moment, are producing centrifugal-force components in the desired direction of travel are either positioned at, or just approaching, or just leaving the maximum-radial-distance predetermined sector; this resulting in an unbalanced centrifugal force in the direction of the maximum-radial-distance predetermined sector.

BRIEF DESCRIPTION OF THE DRAWINGS

In the accompanying drawings forming part of this specification, and in which like reference characters are employed to designate like parts throughout the same.

DESCRIPTION OF THE PREFERRED EMBODIMENTS

In the description that follows, the two identical sets of rotating masses are designated by reference letters A and B, the set A rotating in a clockwise direction and the set B rotating in a counterclockwise direction. Components that belong to or that are associated with set B include the prime sign with their character designations.

Figure 1:
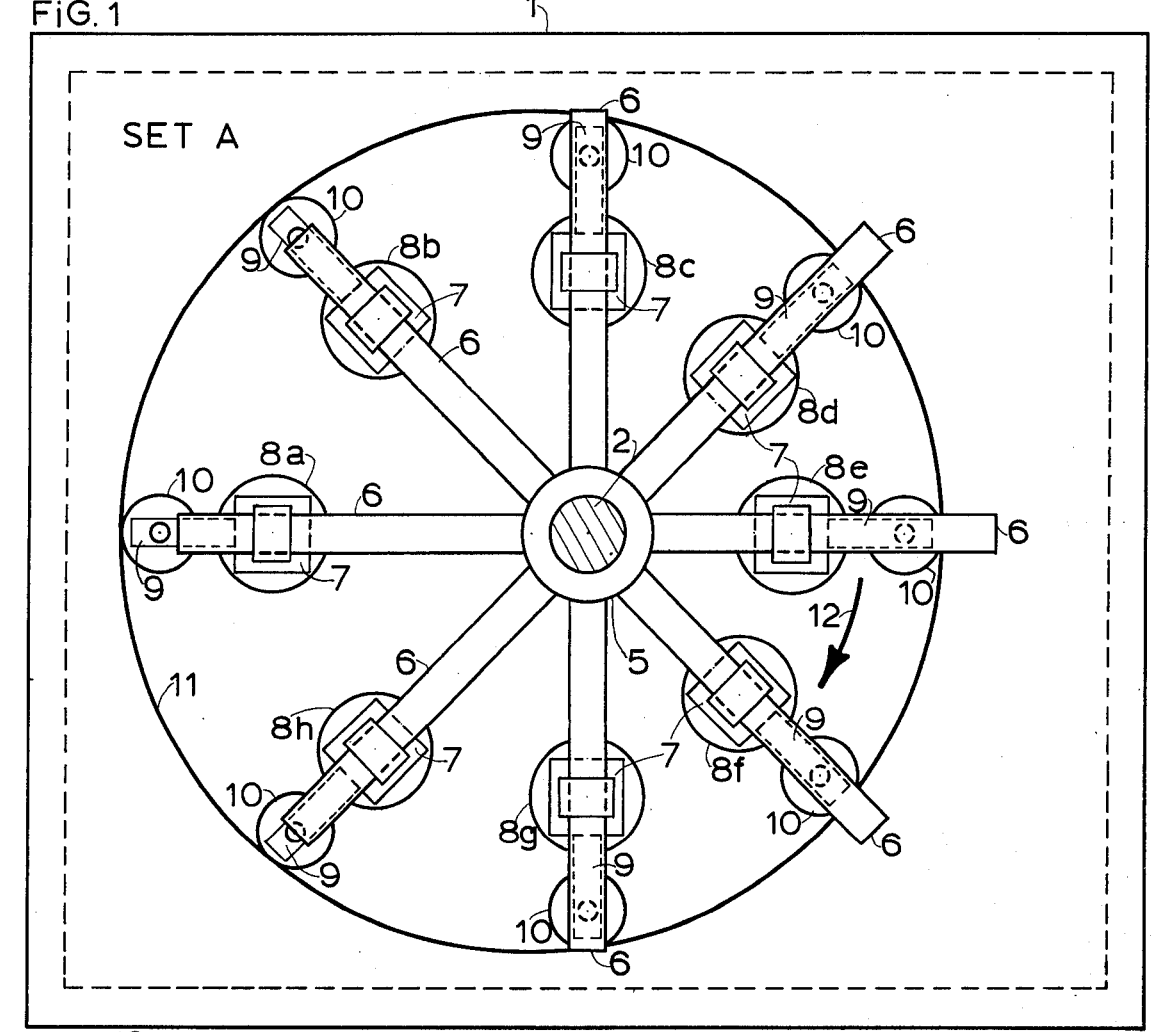
FIG. 1 is a top plan view of one of the two identical sets of revolving masses and their associated components.

Referring now to the drawings in detail and in particular to FIG. 1, there is illustrated a top plan view of one set, set A, of the two identical sets of rotating masses and their associated components. The device constructed in accordance with the principles of the present invention and which is comprised of chambers or housings 1, 1', both of which are attached to some movable vehicle or to some other movable structure (not shown), and each of which has mounted therein a drive shaft 2, 2', journaled for rotation in bearings 3, 3'. Keyed to each drive shaft 2, 2', is mass-support structure 5, 5', each of which is comprised of two identical, axially spaced-apart sets of 8 each radially extended cylindrical arms, 6, 6', the axis of each cylindrical arm 6, 6', forming a 45° angle with its adjacent arms. Mounted for free radial sliding linear movement on each cylindrical arm 6, 6', is a pillow block ball bushing 7, 7', each pillow block ball bushing 7, 7', being attached to one end of a cylindrical mass 8a - 8h, 8a' - 8h', and to one end of wheel-support member 9, 9', each of which has mounted thereon for rotation with ball bearings a wheel, 10, 10', which, during operation, is in rolling contact with an eccentrically disposed circular member 11, 11'.

The direction of rotation is indicated by arrow 12 and the desired direction of travel is indicated by arrow 13. The position of mass 8a corresponds to the position of the maximum-velocity predetermined sector, and the position of mass 8e corresponds to the position of the minimum-velocity predetermined sector, which predetermined sectors corresponds respectively to the maximum-radial-distance and the minimum-radial-distance predetermined sectors.

Figure 2:
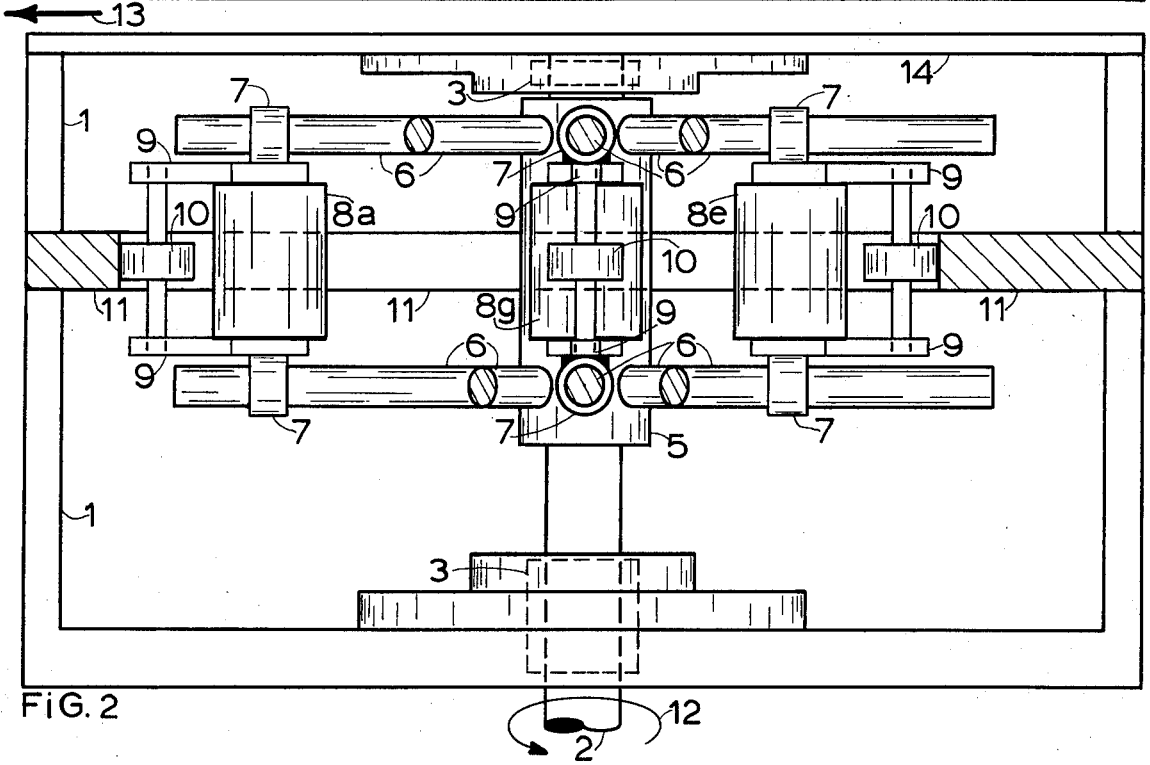
FIG. 2 is a side view of some of the components illustrated in FIG. 1.

FIG. 2 is a side view of part of what is illustrated in FIG. 1. Only three masses and their associated components are illustrated. Mounted on the inner surface of plate 14 is a bearing 3 which receives one end of drive shaft 2.

Figure 3:
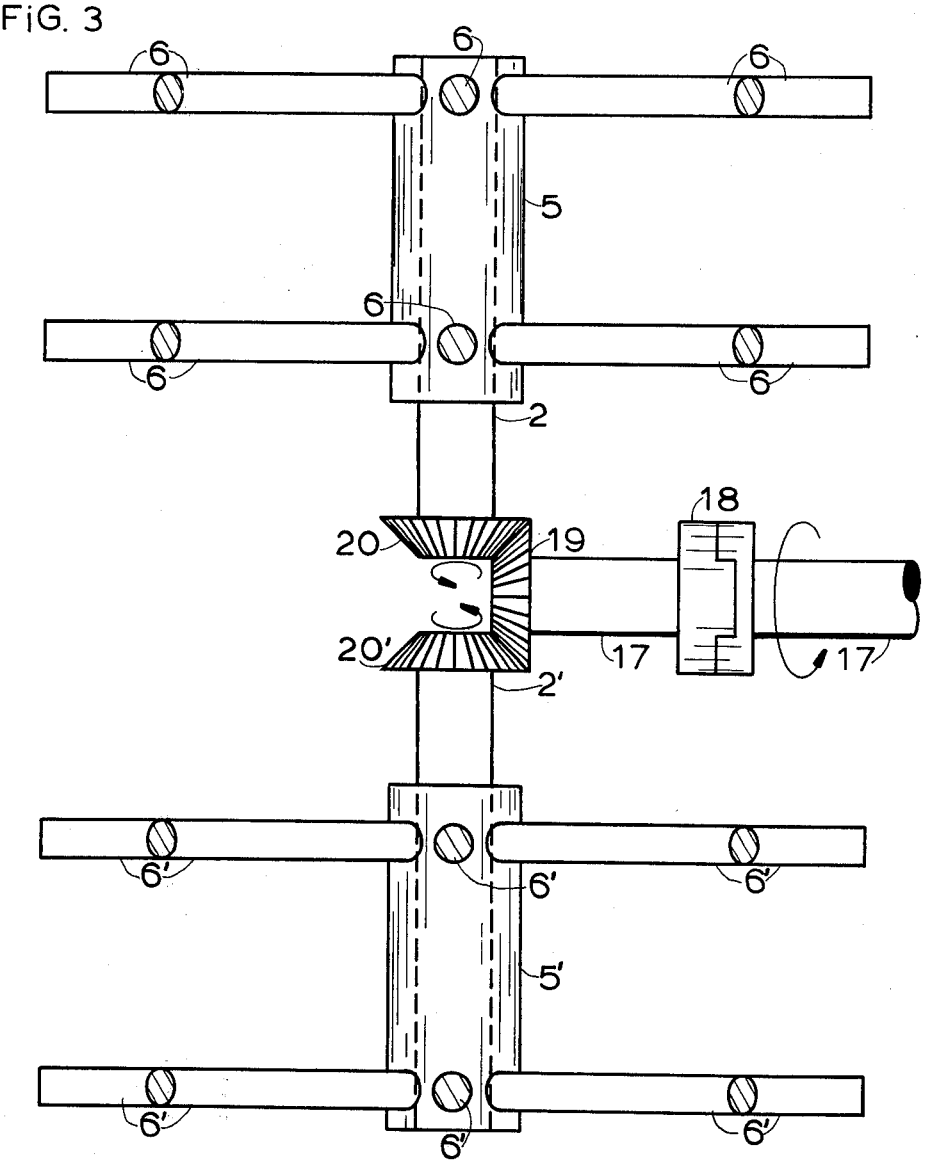
FIG. 3 is a side view of the rotating support structures for the slidable rotating masses and one possible drive system for rotating them in opposite rotative directions.

Illustrated in FIG. 3 is one possible drive system for rotating the two sets of masses, set A, set B, and is comprised of a drive shaft 17 which is coupled through clutch 18 to a motor (not shown). Keyed to one end of drive shaft 17 is a bevel gear 19 which is in driving engagement with bevel gears 20, 20'. Bevel gears 20, 20' are keyed to drive shafts 2 and 2' respectively and thus drive these shafts and their associated components in opposite directions.

In operation, the rotation of drive shafts 2, 2' in opposite rotative directions causes the sliding-mass support structures 5, 5' and the masses attached to them to also rotate in opposite directions. The centrifugal force produced by each rotating mass causes each mass to move radially outward from the axis of rotation to the radial distance where each wheel 10 that is attached to each mass comes in contact with the eccentrically disposed circular member 11 (referring to FIGS. 1 and 2) which causes the radial distance of each mass to continuously vary as it rotates. Since the magnitude of the centrifugal force produced by a rotating mass is a function of its velocity squared, and since the curvilinear velocity of a gyrating mass is proportional to the radius of gyration, the centrifugal force produced by each mass continuously varies as the masses rotate.

The orientation of the eccentrically disposed circular members 11 and 11' with respect to the axis of rotation of the rotating masses is such that the position in the path of rotation where the masses attain their maximum radial distance, and thus also produce the maximum centrifugal force, is made to correspond to the direction of the desired direction of travel. The rotation of the two identical sets of masses in opposite directions causes a cancellation of forces produced by the rotating masses in all directions except in the direction which is parallel to the axis which passes through both the maximum- and minimum-radial-distance predetermined sectors. The difference between the centrifugal force produced by the masses when they pass through the maximum-radial-distance predetermined sector and the centrifugal force produced by the masses when they pass through the minimum-radial-distance predetermined sector results in an unbalanced centrifugal force which acts in the direction of the maximum-radial-distance predetermined sector.

Having thus described the invention, what is claimed:

1. In a device that converts rotary motion into unidirectional motion by varying the radius of gyration of a plurality of gyrating masses which device includes means for both supporting and permitting sliding radial movement of said plurality of gyrating masses, the improvement comprising:

a shaft;

a hub mounted on said shaft;

two, identical, axially spaced-apart sets of cylindrical arms fixed to and extending radially from said hub;

a plurality of bearings each mounted on one of said radially extending cylindrical arms for sliding linear movement with respect thereto;

said cylindrical arms in each of said sets being secured at one end to and spaced at equal angular intervals about the circumference of said hub such that each arm of one of said sets is in substantial alignment with an arm of the other of said sets to provide aligned pairs of arms having aligned pairs of bearings thereon;

each of said radially moveable gyrating masses being mounted between the said sets of arms by securement to both members of a pair of bearings on each of a pair of aligned arms;

a wheel or roller type cam-follower for each of said gyrating masses;

means for supporting each of said wheel or roller type cam-followers in fixed relationship to their respective gyrating masses;

a circular cam track in radially spaced and encircling relationship with respect to said gyrating masses and eccentrically disposed with respect to the axis of said shaft;

said wheel or roller type cam-followers being maintained in rolling contact with said cam track by the centrifugal force produced by said gyrating masses during rotation of said shaft; and means for rotating said shaft.

2. The device of claim 1 in which there are two such devices each having identical but separate drive shafts, hubs, sets of arms, wheel or roller type cam-followers, cam tracks, aligned pairs of bearings, and gyrating masses; and in which said means for rotating said drive shafts includes means for rotating them in opposite directions relative to each other.

* * * * *